United States Patent [19]

Rosenthal et al.

[11] 3,736,494

[45] May 29, 1973

[54] APPARATUS FOR FILM TREATMENT

[75] Inventors: Louis A. Rosenthal, Highland Park; Donald A. Davis, Somerville, both of N.J.

[73] Assignee: Union Carbide Corporation, New York, N.Y.

[22] Filed: July 12, 1971

[21] Appl. No.: 161,598

Related U.S. Application Data

[63] Continuation-in-part of Ser. No. 66,833, Aug. 25, 1970, abandoned, which is a continuation-in-part of Ser. No. 862,307, Sept. 30, 1969, abandoned, and a continuation-in-part of Ser. No. 862,412, Sept. 30, 1969, abandoned.

[52] U.S. Cl. ....321/45 R, 250/49.5 GC, 250/49.5 TC

[51] Int. Cl. ............................................H02m 7/48

[58] Field of Search .................250/49.5 TC; 321/18, 321/45, 45 C

[56] References Cited

UNITED STATES PATENTS

| | | | |
|---|---|---|---|
| 3,514,393 | 5/1970 | Eisby | 204/312 |
| 3,294,971 | 12/1966 | Von Der Heide | 250/49.5 TC |
| 3,047,789 | 7/1962 | Lowry | 321/18 |
| 3,496,092 | 2/1970 | Fraser | 321/45 X |

OTHER PUBLICATIONS

Principles of Inverter Circuits, Bedford & Hoft, John Wiley & Sons, Inc., New York–London–Sydney, 1964, pp. 141, 165–166, 184–186, 208, 263.

*Primary Examiner*—William M. Shoop, Jr.
*Attorney*—Paul A. Rose, Gerald R. O'Brien and Aldo John Cozzi

[57] ABSTRACT

Method and apparatus are disclosed for the surface treatment of a plastic body by exposure to a high intensity voltage in the sonic frequency range accompanied by corona discharge, which comprises employing as said voltage a series of alternating-directional pulses of electrical voltage produced by energizing a pulse-forming network in which the requisite inductance and capacitance are provided exclusively by the transformer and the film treating load.

16 Claims, 9 Drawing Figures

INVENTORS
LOUIS A. ROSENTHAL
DONALD A. DAVIS

BY

ATTORNEY

INVENTORS
LOUIS A. ROSENTHAL
DONALD A. DAVIS

BY

ATTORNEY

INVENTORS
LOUIS A. ROSENTHAL
DONALD A. DAVIS
BY
ATTORNEY

INVENTORS
LOUIS A. ROSENTHAL
DONALD A. DAVIS
BY
ATTORNEY

INVENTORS
LOUIS A. ROSENTHAL
DONALD A. DAVIS
BY
ATTORNEY

INVENTORS
LOUIS A. ROSENTHAL
DONALD A. DAVIS

BY

ATTORNEY

APPARATUS FOR FILM TREATMENT

This application is a continuation-in-part of out copending application Ser. No. 66,833 entitled "Film Treatment," filed on Aug. 25, 1970 which was, in turn, a continuation-in-part of our application Ser. No. 862,307 entitled "Improvements in Film Treating" and our copending application Ser. No. 862,412 entitled "Film Treating Method and Apparatus," both filed Sept. 30, 1969, all of which are now abandoned.

Exposing the surface of a polymer body, such as polyethylene film, to a high voltage gaseous discharge having corona characteristics is known to improve the affinity of the surface for adhesives, inks and other polar substrates. The treatment zone of a typical system comprises a relatively large ground electrode separated from one or more relatively sharp high voltage electrodes by two and preferably three dielectrics. The essential dielectrics are an ionizable gaseous dielectric, normally air, and polymeric body to be treated. Normally, the ground electrode is covered with a "buffer" dielectric, such as rubber or a polyester film, which acts to preclude an arc from bridging the gap at weak points in the polymer body. The high voltage electrode, which may consist of one or more treater bars in series or in parallel, runs the length of the ground electrode and is in circuit with a high voltage generator.

Most commercial treating systems employ alternating current supplied at frequencies up to 500 kHz or more. Gap voltages up to 15 kv or more are employed to effectively treat a polymer film which is continuously passed through the gap at speeds up to 500 feet per minute or more. In practice, an energy density-to-film surface of the order of about 1 watt-minute per square foot of film surface or more is sought to achieve good surface adhesion characteristics.

While every component of a film treating system has come under investigation from time to time, the waveform of the high voltage employed in the treating system has generally been neglected. The spark-gap generators and motor alternators now in use are inefficient and suffer from many inherent deficiencies.

In addition to interfering with radio reception, due to the presence of radio frequencies in the spark-gap generator output wave, the generator has a short duty cycle. The range of output power for a given generator is severely limited by spark gap characteristics.

The motor alternator, on the other hand, is cumbersome in size and subject to frequent mechanical failure. Further, its output is sinusoidal which is far from the ideal waveform.

In a typical high voltage film treating system, an alternating current line voltage is fed to a high voltage generator and the generator alternating current output is fed through an output transformer to the treating circuit load.

The load should be viewed as a lossy capacitor wherein the electrodes, in their area and spacing, define the capacitance and the dielectric is a composite made up of an air gap, the film and the buffer dielectric all in series. As the corona voltage threshold level is reached, the losses of this system vary in a nonlinear manner. It is the loss component which is effective in treatment and the recognition of the capacitive-reactive behavior of the load is important.

The concept of variable frequency has been only recently recognized as an all important parameter for load adjustment and optimization in film treating operations. Looking at the corona treating region as a lossy capacitor system, the power would be proportional to frequency just as, for a given input voltage, the current entering a capacitor is linear with frequency.

In our copending application Ser. No. 106,377, it is recognized that an alternating-directional, sonic frequency electrical voltage employed for film treating may be of a broad range of sonic frequency and that frequency can be varied to effect surface treatment under maximum loading conditions. Accordingly, a treating system capable of broad frequency variation of treating voltage over a range of 20 to 20,000 Hz is provided. The alternating-directional electrical treating voltages are capable of frequency variation within the sonic range in order to provide optimization of the power transferred to the load treating circuit. Output frequency variation is effected by a variation in frequency of the timing circuit which, in turn, varies the frequency of the voltage.

In our other copending application, Ser. No. 106,376, method and apparatus are disclosed wherein the plastic surface is exposed to a high intensity voltage accompanied by corona discharge and wherein the voltage comprises a series of alternating-directional, sonic frequency pulses of electrical voltage. In the disclosure of that copending application, the significance of the waveform of the treating voltage is recognized and the sonic frequency electrical voltage possesses a pulse waveform. The alternating-directional, sonic frequency pulses of electrical voltage are developed in a pulse forming circuit within the generator having a capacitive and an inductive element arranged in series-circuit relationship. There is a power input of direct current to the pulse-forming circuit, control means for triggering the pulse-forming circuit with a timing signal and an output transformer for applying the generated sonic frequency pulses of electrical energy to the load treatment circuit.

The optimum waveform for a corona generator is a pulse, for the load is always capacitive in behavior. Since the current in a capacitor follows $i = C dv/dt$, a high $dv/dt$ (derivative with respect to time) will deliver more current into the discharge. A pulse which rapidly goes up and down, approaching an impulsive waveform, is ideal. Square waves and sine waves, which have been employed as the driving voltage in the prior art, are far from the desired waveform. Typically, the square wave only passes current into the corona load during the transition from positive to negative, or from negative to positive. During the constant region ($dv/dt = 0$), no corona is generated and power losses in many electrical components are maintained. The same is true of a sine wave, but to a lesser degree.

In the drawings:

FIG. 1 (*a*) and (*b*) are schematic representations of circuit voltage and load current, respectively, for a capacitive corona discharge treating load employing a square wave voltage;

FIG. 2 (*a*) and (*b*) are schematic representations of circuit voltage and load current, respectively, for a capacitive corona discharge treating load employing a voltage having a pulse waveform;

Figure 3:
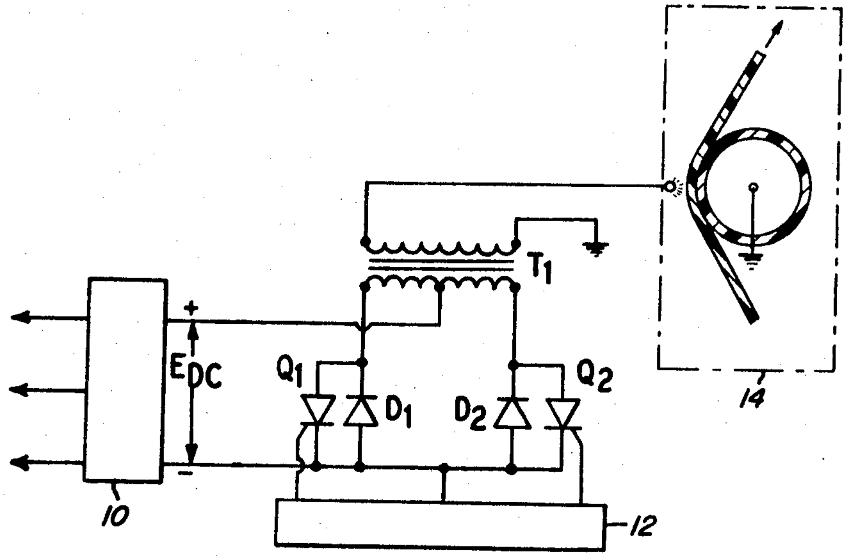
FIG. 3 is a simplified schematic view of high voltage corona discharge film treating apparatus embodying the present invention.
Figure 4:
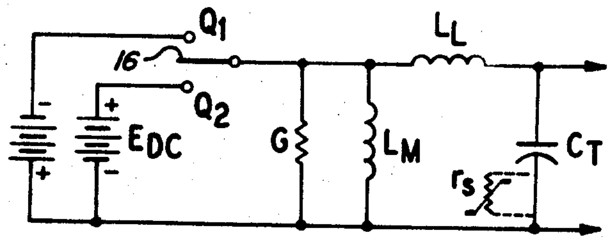
FIG. 4 is an equivalent circuit of the circuit of FIG. 3.
Figure 6:
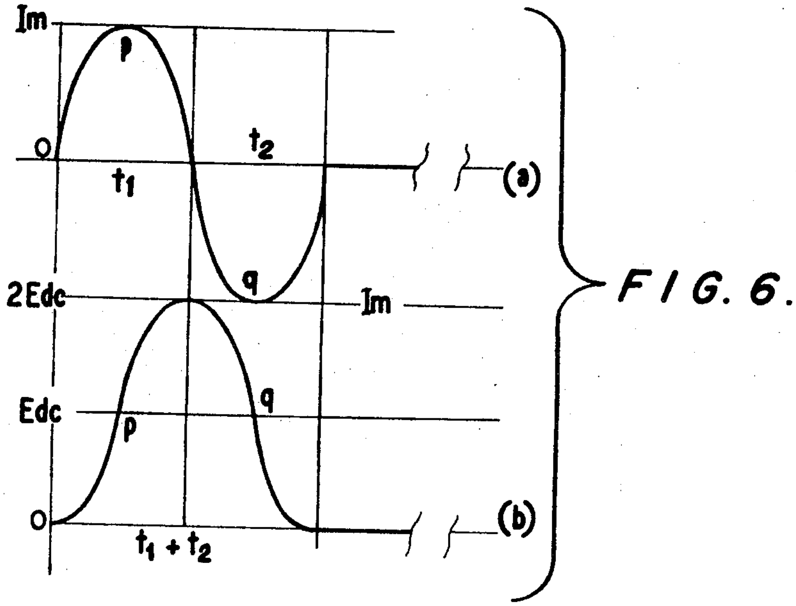
Figure 7:
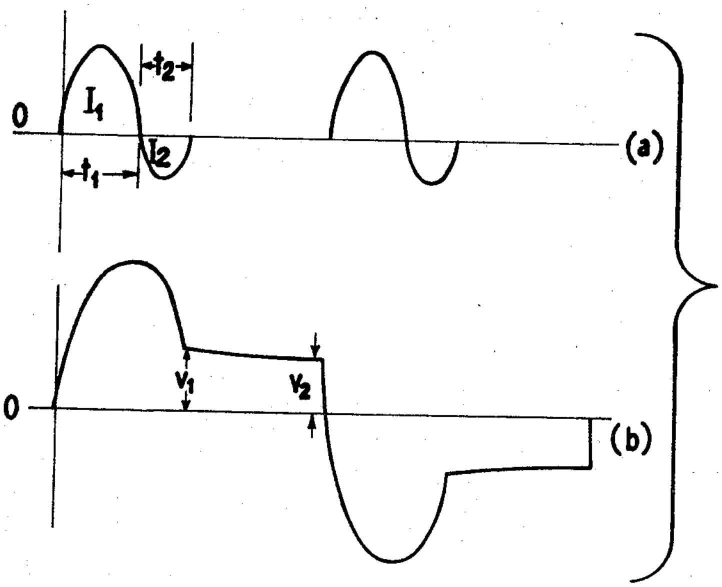
Figure 8:
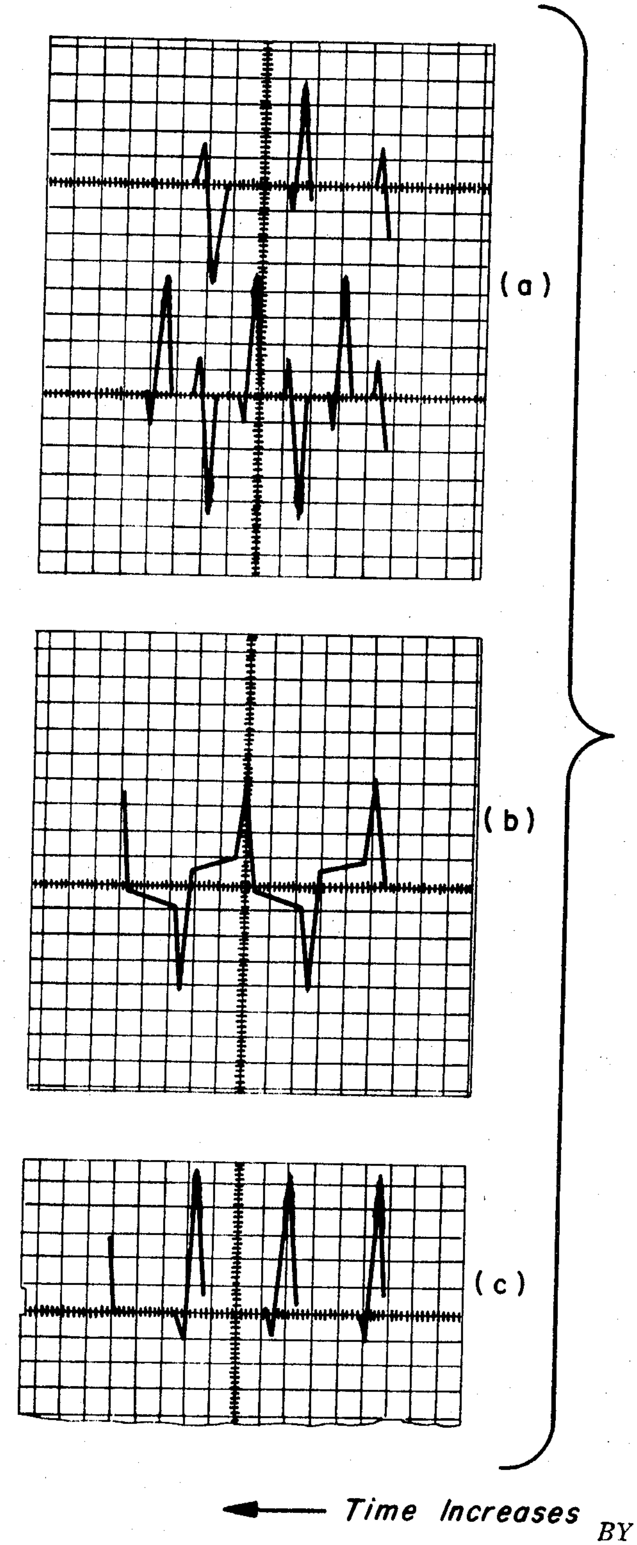
Figure 9:
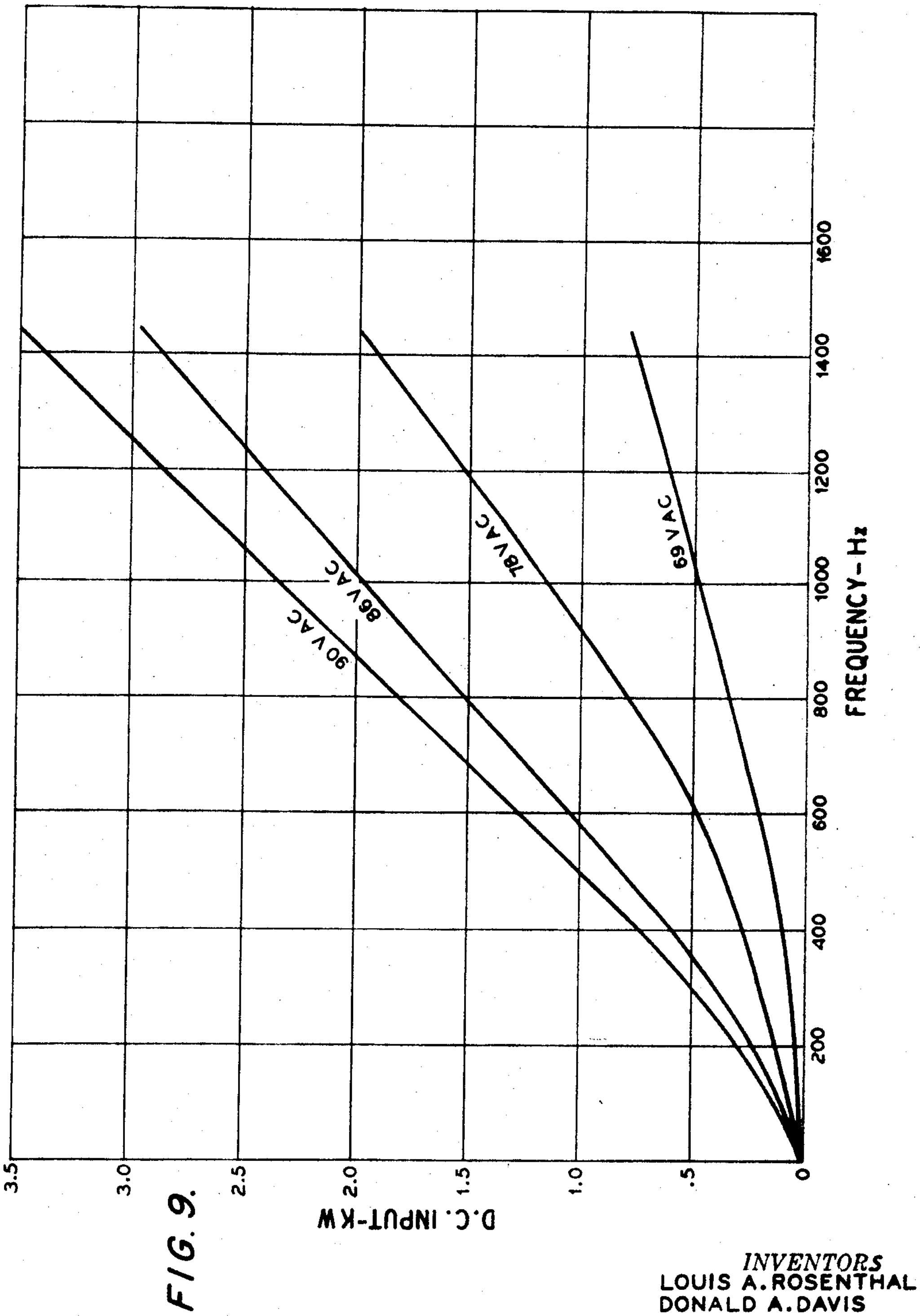

FIG. 6 (*a*) and (*b*) are schematic idealized representations of line current and capacitor voltage waveforms, respectively, for the equivalent circuit of FIG. 4;

FIG. 7 (*a*) and (*b*) are schematic representations of power source output current and secondary voltage waveforms, respectively, for the circuit of FIG. 3;

FIG. 8 (*a*), (*b*) and (*c*) are traces of waveforms respectively showing the corona load current for two different frequencies, load circuit input voltage and primary center-tap line current for the circuit of FIG. 3; and FIG. 9 is a graphical representation of the relationship between input power and frequency employed for operations at varying voltage levels in the practice of the present invention.

Figure 1:
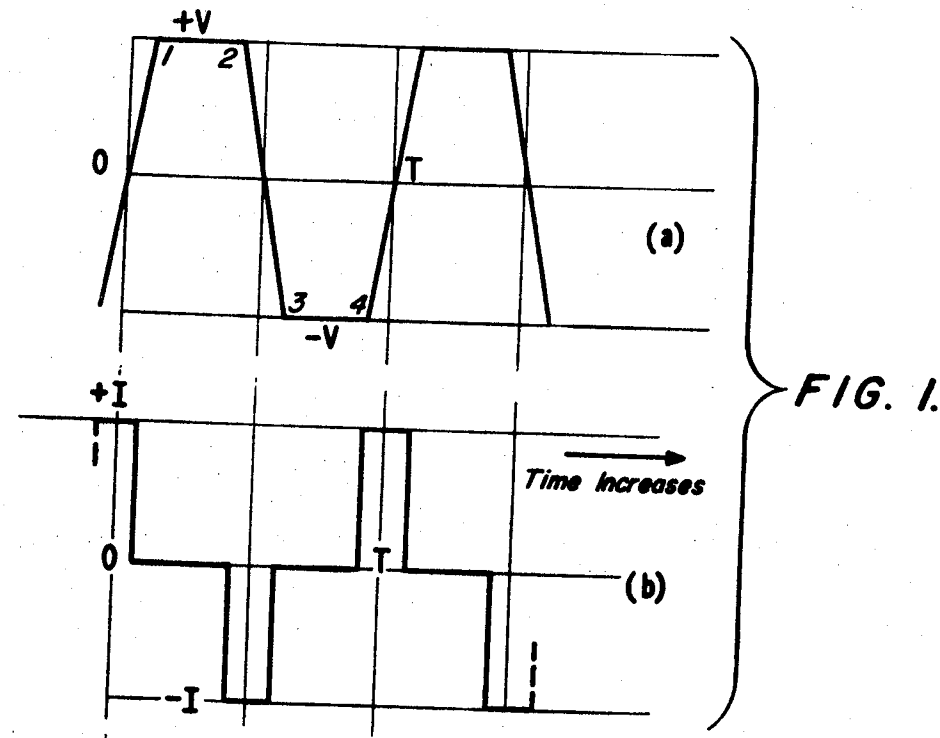
Figure 2:
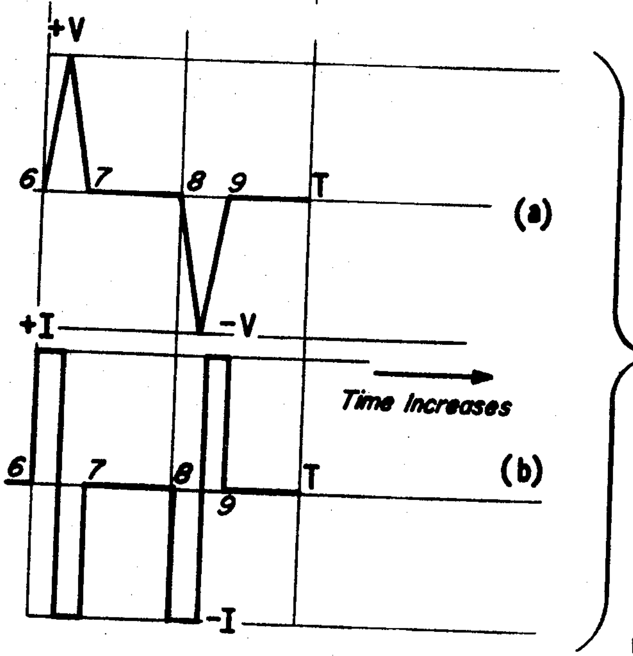

The sketches of FIGS. 1 and 2 of the drawings illustrate this concept. In the waveform designated (*a*), for a full cycle period 0–T, the trapezoidal voltage wave (the realizable equivalent to a square wave) results in the current waveform designated as (*b*). If the waveform portions 1–2, and 3–4 are deleted from the voltage waveform (*a*), a waveform as shown in 2(*a*) is obtained at the same period. This voltage waveform when applied to a corona treatment load results in the current waveform shown in 2(*b*). It is to be noted that the average and rms values of both current waveforms 1(*b*) and 2(*b*) are identical but, due to the omission of the portions 1–2 and 3–4, the circuit is left in an "idle" state. Only the rise and fall have been employed. If we apply this deletion concept to a sine waveform, a cosine pulse could be substituted for the triangular pulse shown in region 6–7 (and 8–9) for the waveform 2(*a*).

An advantage of this waveform is realizable in power control. Since the duty cycle (on time/period time) is reduced, pulses can be caused to slide together and proportionately increase the power. For example, if more pulses are inserted in the idle time, the power input is increased accordingly. Maximum available power occurs when the pulses merge into one another in a continuous manner. Thus, power is controlled by pulse position or duty cycle control with all pulses equal in magnitude and equivalent to a fixed energy input (per pulse).

Another advantage of the use of this waveform is the symmetry which is essential in the successful operation of a corona generator for plastic surface treatment. During corona discharge, the dielectric surface assumes a charge layer which is the basic mechanism of a quenched corona discharge. This charge must be removed by a subsequent reverse corona discharge. The symmetrical waveform acquired by push-pull or balanced operation provides for an electrically neutral surface after treatment. If the net charge is not restored to zero, the film or plastic surface can accumulate charge and create a wide variety of handling problems. This symmetrical waveform is a unique requirement of a corona treating generator not always provided by high voltage generators with asymmetric waveforms.

In accordance with the present invention, a method is provided for the surface treatment of a plastic body, wherein said surface is exposed to a high intensity voltage in the sonic frequency range (20 to 20,000 Hz) accompanied by corona discharge, which comprises employing as said voltage a series of alternating-directional, pulses of electrical voltage produced by energizing a pulse-forming network in which the inductance and capacitance are provided exclusively by the transformer and the load.

An advantage of the present invention is self-commutation. This is achieved by generating a pulse waveform wherein the pulse oscillation reverse swing terminates the conduction cycle. The majority of solid state generators as alternating voltage power sources must provide a mechanism to end the conduction cycle and start the alternate cycle. In this invention, a reverse oscillation due to the capacitive nature of the treating load accomplishes the independent cut-off or self-commutation. Energy stored in the corona treating load, which is capacitive, restores the circuit to an off-state for the idle time. The method and apparatus of the invention are unique in that they require a capacitive load for proper operation and are totally suited for corona type loads. Of the wide variety of solid state generators available, the majority are designed for, and operate into, inductive or resistive loads.

As an adjunct of pulse and self-commutation, the corona apparatus of the invention can be keyed rapidly by merely interrupting the trigger pulse. In certain selective treating applications it is essential to rapidly stop, then start, treating i.e., skip treating). Although not essential, it is a desirable feature for corona treating operations.

Apparatus in accordance with the invention employs a generator for delivering, through a transformer to the treatment load circuit, high intensity voltage having a pulse waveform in the sonic frequency range (20–20,000 Hz, preferably 20–5,000 Hz) accompanied by corona discharge. The generator comprises first electrical circuit means for providing a unidirectional source of power, second electrical circuit means for providing an alternating voltage timing signal and power output circuit means comprising switching thyristor means and an output transformer for applying the alternating-directional pulses of electrical voltage to the corona load circuit. The transformer and corona treatment load circuit comprise the pulse-forming network for producing the high intensity alternating voltage of sonic frequency having a pulse waveform. More specifically, in the apparatus of the present invention, the pulse-forming network inductance and capacitance are provided exclusively by the transformer and the corona load, primarily the inductance of the transformer and the capacitance of the corona load.

No additional tunable inductors or capacitors are required or desired and any form of resonance at the operating frequency is to be avoided.

Accordingly, it is the preferred embodiment of the present invention to employ the inductance of the transformer and the capacitance of the load circuit as the exclusive elements of the pulse-forming network.

The circuit of FIG. 3 shows the preferred form of apparatus of the present invention. As there shown, AC power is delivered from the mains, as single or polyphase power, and converted to DC by means of the full wave bridge rectifier and filter circuit 10. Rectification to DC also prevents feedback to the AC line. $Q_1$ and $Q_2$ are silicon controlled rectifiers (SCR) or thyristors which operate as efficient trigger-controlled switches. Each SCR has a reverse diode ($D_1$ and $D_2$) across it to provide reverse conduction or fly-back. It is during the conduction of these diodes that a negative voltage across the SCR restores it to a non-conducting state.

The gate drive 12 (or timing circuit) provides sequential pulses to trigger the SCRs. This circuit, which can have many variations, is well known in the art. The gate signal must be narrow and sufficient in energy content to turn on the SCRs. For power control, the gate frequency should be variable, in a preferred range of 40 to 10,000 pulses per second (i.e., twice the basic frequency). Since it takes two input pulses to complete a single corona cycle, there is a basic division by two. It is to be noted that no reactive circuit components are employed. The output high voltage step-up transformer $T_1$ transfers energy to the capacitive load 14 and also provides a sufficient leakage reactance ($L_L$) required for pulse operation.

An equivalent circuit, which models the operation of the corona generator, is shown in FIG. 4 of the drawings. The SCRs are replaced with the momentary switch 16, normally opened, which is equivalent to the combination of sequentially fired $Q_1$ and $Q_2$. The equivalent of push-pull operation is simulated by a $\pm E_{DC}$ supply driving a single transformer alternately positive and negative. The transformer $T_1$ is replaced by a simplified equivalent consisting of a shunt conductance G, a shunt magnetizing inductance $L_M$, a series equivalent leakage reactance, $L_L$ (including the secondary component reflected into the primary) and $C_T$ the total shunt capacitance including the major component of load capacitance. The resistance $r_s$ is a variable nonlinear resistance representing reflected corona and dielectric losses which vary with the amplitude of the load voltage. The voltage across the capacitance can be applied to the now ideal transformer which steps up the voltage to corona generating levels. Since all load is reflected to the primary, the analysis can ignore any high voltage considerations.

Figure 5:
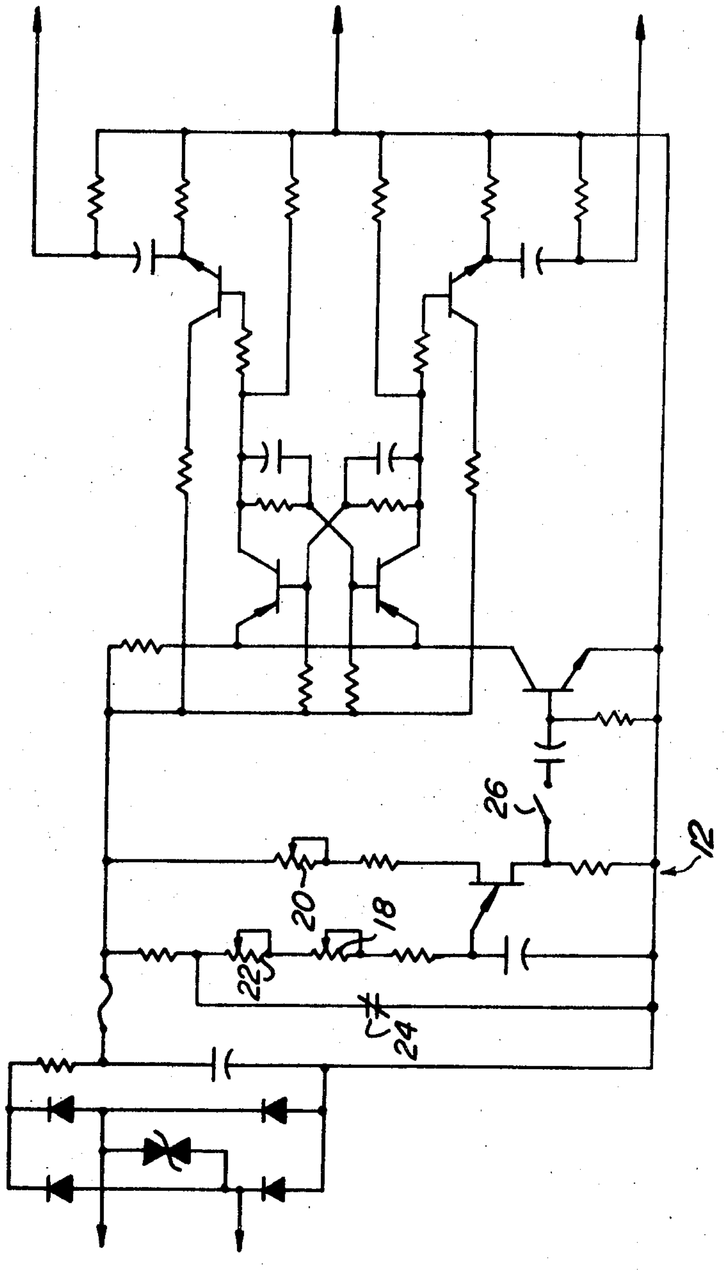
FIG. 5 is a schematic view of a modified timing circuit capable of use in the apparatus of the invention.

A detailed circuit diagram of a typical gate drive timing circuit 12 is shown in FIG. 5 of the drawings. As is there shown, a circuit is disclosed which provides a trigger output signal. The system, as shown, contains a rectifier circuit, a timing circuit, an isolation stage, a bistable multivibrator circuit and an output stage.

The frequency control in the gate drive circuit of FIG. 5 is obtained by the variation of resistive circuit elements 18, 20 and 22. Elements 18 and 20, respectively, control the high and low frequency limits of the timing circuit and, consequently, the frequency range limits of the system output. Variation in resistive element 22 offers load (power) control by means of frequency control of the output of the system. Circuit element 24 is preferably employed as a relay which provides hard-start characteristics in opening, thereby immediately producing drive pulses at the output of the system.

When $Q_1$ is closed, the circuit elements $L_L$ and $C_T$ result in a single full cycle of current oscillation, as shown in FIG. 6 (*a*), wherein $t_1 = t_2 = \pi \sqrt{L_L C_T}$. The current magnitude $I_m = E_{DC}/\sqrt{L_L/C_T}$. Assuming no losses, both halves of the cycle are identical and, since area ( $idt = q$) corresponds to charge, the net charge flow is zero. The capacitor voltage is a cosine-type pulse, starting from and returning to zero. When stepped up by the transformer turns ratio, this is the basic pulse waveform of the secondary corona voltage. No energy is transferred to the load and the waveforms of FIG. 6 will be inverted about 0 by the closure of $Q_2$ (in FIG. 4) at the next trigger signal. For this case, $t_1 + t_2$ is related to the transformer and load parameters.

Since G, the transformer loss equivalent, exists at all times, there will be some damping of the waveform resulting in the second half ($t_2$) of the cycle, less than the first half ($t_1$). With voltages significantly large to ionize the air gap at the corona load (i.e., >5,000 volts), a major nonlinear loss component is now reflected into $C_T$ (FIG. 4) as a series resistor, $r_s$. The instantaneous maximum of corona losses will take place in the vicinity of *p* in the voltage and current waveforms, as shown in FIG. 6. At the voltage maximum, the current is forced to zero since $dv/dt = 0$. Losses due to transformer and corona result in $t_1 > t_2$ and the capacitor voltage not starting or returning to zero. Because energy is lost in the first half cycle, ($t_1$), the second half cycle is insufficient to create a corona discharge and the region $t_2$ as shown in FIG. 6 degenerates to a non-corona back swing. During this time, $t_2$, the diodes conduct and put a small negative voltage across the SCR, opening up the switch. The capacitive energy stored in the corona load is responsible for this reverse current flow. Excessive corona loading will destroy the $t_2$ region and result in no commutation. A minimum $t_2$ is required based on the required turn-off time for the SCR.

FIG. 7 shows the change in waveform with load. Current as seen at the transformer center-tap, as shown in FIG. 7(*a*) is the in-phase summation of a firing of $Q_1$ and $Q_2$. Since the areas (or charge) are not equal, the capacitor is left with a charge or voltage at the end of a cycle $t_1 + t_2$. This voltage, as shown in FIG. 7(*b*) as "$V_1$", decays at a rate primarily established by the G and $L_M$ transformer equivalent circuit shunt path as shown in FIG. 4. The next cycle pulse starts from a voltage $V_2$ and reverses the charge in the manner previously described. With increased load or corona power, $V_1$, the pedestal (back porch) of the voltage waveform, increases. No supply current flows during this time.

Since all power is derived from the DC source ($E_{DC}$), the power delivered is related to the average current according to the equation:

$$\text{Power} = E_{DC}\left[\int_0^{t_1} i_1(t)\,dt + \int_{t_1}^{t_2} i_2(t)\,dt\right] f$$

It is to be noted that $i_2(t)$ is a negative contribution, and that $f = 1/T$, where T is the time for $Q_1$ and $Q_2$ firings; the basic averaging period.

Accordingly, power delivered is linearly related to frequency.

The performance of the operation may be seen from the waveform traces set forth in FIG. 8 of the drawings. All waveforms are to be read right to left, due to the oscilloscope camera inversion. In FIG. 8(*a*), the corona load current is shown for drive frequencies of 700 and 1,400 hertz, respectively. It may be seen, that $t_1 = t_2$ is closely 200 microseconds and, as the frequency is increased, the pulses come closer together, doubling the corona power output. No corona is observed on the smaller back swing pulse and, as discussed for ideal waveforms, two negative (or positive) pulses follow in succession (FIG. 2(*b*)). It is apparent that $t_2 < t_1$ and an upper frequency and corresponding power output is limited to the case where the pulses merge.

Accordingly, it can be seen that it is essential that the self-oscillation period ($t_1 + t_2$) must be less than the trigger period.

The voltage waveform at the secondary under light load is shown in FIG. 8(*b*) and this is the basic ideal waveform desired. In FIG. 8(*c*), the line current is a result of load pulses adding in the common supply connection and the average value (net area) is related to input power. The transformer secondary current of FIG. 8(*a*) has no average value.

The presence of "corona fuzz" in the current waveforms of FIGS. 8 (*a*) and 8 (*c*) is noted.

Because of short duty cycle and the lack of pulse-forming network reactive losses within the generator, the no load (i.e., no corona) or idle input power is trivial. When any single SCR is firing, the peak reverse or blocking voltage on the other SCR is limited to $2E_{DC}$ due to the auto-transformer action of the primary. This is an advantage of this circuit design, since blocking voltage is a critical thyristor parameter. The maximum peak output voltage is the product of twice $E_{DC}$ and the transformer secondary to half-primary voltage ratio. For example, a transformer ratio of 100:1:1 will result in 30,000 volts if the supply is 150 volts ($E_{DC}$). The factor 2 $E_{DC}$ was shown in FIG. 6 (*b*) as a result of the charging of $C_T$.

Experimental "power delivered" curves for a prototype generator are shown in FIG. 9 as a function of drive frequency. The AC supply voltage was controlled in this experiment to show the nonlinear corona loading with applied voltage (follow a vertical line at constant frequency). This unit was a three phase power input design rated for 6 KW, and the load was an actual corona load. It is obvious that, to control power by voltage adjustment, requires fine, narrow-range, control. However, at fixed voltage, there is near-linear control with the drive frequency. This suggests that the corona generator can be best designed with a constant input supply voltage, while using frequency (as opposed to voltage control of the prior art) as the load or power delivered adjustment.

The "keying feature" of the generator is a result of the self-commutation capability. If the gate drive source is disconnected, the output drops immediately to zero. When drive is reapplied, corona power output exists. A fast-acting switch may be installed in series with the gate drive (as element 26 in the circuit of FIG. 5) to "key" the corona treatment generator. It is also possible to limit the overload level by sensing the negative swing of the line current (FIG. 8(*c*)) and, at some minimum level, disconnecting the gate drive. This back swing is essential to proper operation and, as load increases, it will start to decrease. In a similar manner, the average current in the line can be sensed and the gate drive can be disconnected at some preset level. The details of overload control are not a part of this invention, but the concept of shutting the generator off by means of disconnecting the gate drive is within the scope of the present invention.

In an example of film treating in accordance with the present invention, low slip polyethylene films were treated. The films were 96 inches wide, 2 mils thick, and were traveling through the treatment zone at 70 feet per minute. The treating electrodes were four treating bars, each 8 feet long and arranged two above and two below the film. A treating rate of 1,120 sq. ft./minute was obtained.

One such series of operations, employing a 6.4 KW solid state corona film treater embodying the invention, produced treated film product which passed all tests and had the power input vs. surface tension relationships set forth as follows:

| Test No. | Power Input (KW) | Treatment Level (Dynes/cm) |
|---|---|---|
| 1 | 1.7 | 40 |
| 2 | 3.2 | 41 |
| 3 | 4.8 | 42 |
| 4 | 6.4 | 42 |

Treatment Level values obtained by ASTM 2578-67 Test for Wetting Tension of Polyethylene Films.

In these treating operations, the spacing from electrode to film was 100 mils, the electrode bar widths were 1 inch (T-bar cross-section). The apparatus of the invention, as shown in the embodiment of FIGS. 3 and 5 of the drawings, was employed for these treating operations and the selected circuit components and parameters were as follows:

Input AC - 3 phase, 480 volt, 60 Hz.
Input DC - 160 volts
$Q_1$ and $Q_2$: Westinghouse 2N3890 thyristors (SCR)
$D_1$ and $D_2$: International Rectifier IN3090 diodes
$T_1$: G.E. 10 KVA, single phase, control power transformer, 120/240 primary voltage, 13,300 secondary voltage (two - 7½% secondary taps). - 9P-28Y-5615

What is claimed is:

1. In the surface treatment of a plastic body, wherein said surface is exposed to a high intensity voltage in the sonic frequency range accompanied by corona discharge, the improvement which comprises employing as said voltage a series of alternating-directional pulses of electrical voltage produced by energizing a pulse-forming network in which the inductance and capacitance are provided exclusively by the transformer and the load.

2. In the surface treatment of a plastic body, wherein said surface is exposed to a high intensity voltage in the sonic frequency range accompanied by corona discharge produced by a generator connected through a transformer to the load treatment circuit, the improvement which comprises employing as said voltage a series of alternating-directional pulses of electrical voltage produced by energizing a pulse-forming network in which the inductance and capacitance are provided exclusively by said transformer and said load treatment circuit.

3. In apparatus for the surface treatment of a plastic body, employing a generator for delivering, through a transformer to the treatment load circuit, high intensity alternating voltage accompanied by corona discharge, the improvement which comprises employing as said generator first electrical circuit means for providing a unidirectional source of power, second electrical circuit means for providing a trigger signal, and output electrical circuit means, said transformer and treatment load circuit exclusively comprising the inductive and capacitive components of pulse-forming circuit means for producing the high intensity alternating voltage pulses of sonic frequency.

4. Apparatus in accordance with claim 3, wherein interruption means is provided in said second electrical circuit for rapidly disconnecting the supply of trigger signal to said output electrical circuit means.

5. Apparatus in accordance with claim 4, wherein said interruption means comprises a fast-acting switch.

6. In apparatus for the surface treatment of a plastic body, employing a generator for delivering, through a transformer to the treatment load circuit, high intensity alternating voltage accompanied by corona discharge, the improvement which comprises employing as said generator output electrical circuit means including sequentially switching thyristor means, electrical circuit means for providing a unidirectional source of power to said output electrical circuit means, and electrical circuit timing means for providing a trigger signal to said output electrical circuit means, said transformer and treatment load circuit exclusively comprising the components of pulse-forming circuit means for producing the high intensity alternating voltage pulses of sonic frequency.

7. Apparatus in accordance with claim 6, wherein interruption means is provided in said electrical circuit timing means for rapidly disconnecting the supply of trigger signal to said output electrical circuit means.

8. Apparatus in accordance with claim 7, wherein said interruption means comprises a fast-acting switch.

9. Apparatus in accordance with claim 6, wherein said timing means comprises a rectifier circuit, a timing circuit, an isolation stage, a bistable multivibrator circuit and an output stage.

10. In apparatus for the surface treatment of a plastic body, employing a generator for delivering, through a transformer to the treatment load circuit, high intensity alternating voltage accompanied by corona discharge, the improvement which comprises employing as said generator first electrical circuit means for providing a unidirectional source of power, second electrical circuit means for providing a trigger signal, and output electrical circuit means including sequentially switching thyristor with self-commutating diode means and a center-tapped output transformer, said transformer and treatment load circuit exclusively comprising the components of pulse-forming circuit means for producing the high intensity alternating voltage pulses of sonic frequency.

11. Apparatus in accordance with claim 10, wherein interruption means is provided in said second electrical circuit for rapidly disconnecting the supply of trigger signal to said output electrical circuit means.

12. Apparatus in accordance with claim 11, wherein said interruption means comprises a fast-acting switch.

13. In apparatus for the surface treatment of a plastic body, employing a generator for delivering, through a transformer to the treatment load circuit, high intensity alternating voltage accompanied by corona discharge, the improvement which comprises employing as said generator output electrical circuit means including sequentially switching thyristor with self-commutating diode means and a center-tapped output transformer, electrical circuit means for providing a unidirectional source of power to said output electrical circuit means, and electrical circuit timing means for providing a trigger signal to said output electrical circuit means, said transformer and treatment load circuit exclusively comprising the components of pulse-forming means for producing the high intensity alternating voltage pulses of sonic frequency.

14. Apparatus in accordance with claim 13, wherein interruption means is provided in said electrical circuit timing means for rapidly disconnecting the supply of trigger signal to said output electrical circuit means.

15. Apparatus in accordance with claim 14, wherein said interruption means comprises a fast-acting switch.

16. Apparatus in accordance with claim 13, wherein said timing means comprises a rectifier circuit, a timing circuit, an isolation stage, a bistable multivibrator circuit and an output state.

* * * * *